United States Patent
Bakir et al.

(10) Patent No.: US 11,003,667 B1
(45) Date of Patent: May 11, 2021

(54) CONTEXTUAL INFORMATION FOR A DISPLAYED RESOURCE

(71) Applicant: Google Inc., Mountain View, CA (US)

(72) Inventors: Gokhan H. Bakir, Zurich (CH); Suleyman Yurekli, Zurich (CH); Cristiano De Carvalho, Adliswil (CH); Behshad Behzadi, Zurich (CH); Aneto Okonkwo, Chicago, IL (US); Paige Alexis Dunn-Rankin, San Francisco, CA (US); Vikram Aggarwal, Mountain View, CA (US); Aparna Chennapragada, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 552 days.

(21) Appl. No.: 15/167,042

(22) Filed: May 27, 2016

(51) Int. Cl.
*G06F 16/2457* (2019.01)
*G06F 16/248* (2019.01)
*G06F 16/28* (2019.01)
*G06F 16/583* (2019.01)

(52) U.S. Cl.
CPC ...... *G06F 16/24575* (2019.01); *G06F 16/248* (2019.01); *G06F 16/24578* (2019.01); *G06F 16/284* (2019.01); *G06F 16/5846* (2019.01)

(58) Field of Classification Search
CPC ......... G06F 17/30528; G06F 17/30253; G06F 17/30554; G06F 17/3053; G06F 17/30595
See application file for complete search history.

(56) References Cited

U.S. PATENT DOCUMENTS

| | | | |
|---|---|---|---|
| 7,389,181 | B2 | 6/2008 | Meadow |
| 7,689,613 | B2 | 3/2010 | Candelore |
| 7,788,266 | B2 | 8/2010 | Venkataraman |
| 8,316,019 | B1 | 11/2012 | Ainslie et al. |
| 8,321,406 | B2 * | 11/2012 | Garg ................. G06F 16/90324 707/717 |
| 8,391,618 | B1 | 3/2013 | Chuang |
| 8,392,435 | B1 | 3/2013 | Yamauchi |

(Continued)

OTHER PUBLICATIONS

U.S. Appl. No. 13/069,978, filed Mar. 23, 2011, Taubman et al.

(Continued)

*Primary Examiner* — Aleksandr Kerzhner
*Assistant Examiner* — Aryan D Toughiry
(74) *Attorney, Agent, or Firm* — Middleton Reutlinger

(57) ABSTRACT

Methods, systems, and apparatus, including computer programs encoded on a computer storage medium, for providing contextual information for a displayed resource. In one aspect, a method includes receiving, from a user device, a query-independent request for contextual information relevant to an active resource displayed in an application environment on the user device, identifying multiple search items from the content in the resource, determining a relevance score for each of the multiple search items, selecting one or more of the multiple search items based on the relevance scores, and providing, to the user device for each of the selected one or more multiple search items, a respective contextual user interface element for display with the active resource, where each contextual user interface element includes contextual information regarding the respective search item.

20 Claims, 6 Drawing Sheets

(56) References Cited

U.S. PATENT DOCUMENTS

| | | | |
|---|---|---|---|
| 8,515,185 | B2 | 8/2013 | Lee |
| 8,521,764 | B2 | 8/2013 | Pfleger |
| 8,606,781 | B2 | 12/2013 | Chi et al. |
| 8,898,095 | B2 | 11/2014 | Agrawal |
| 2001/0053968 | A1 | 12/2001 | Galitsky |
| 2003/0014438 | A1* | 1/2003 | Devillers .............. G06F 40/149 |
| 2007/0060114 | A1* | 3/2007 | Ramer ................ G06F 16/9535 455/418 |
| 2007/0071320 | A1 | 3/2007 | Yada |
| 2007/0140595 | A1 | 6/2007 | Taylor |
| 2007/0214131 | A1 | 9/2007 | Cucerzan |
| 2008/0028036 | A1* | 1/2008 | Slawson ................ H04L 67/02 709/217 |
| 2008/0046405 | A1 | 2/2008 | Olds et al. |
| 2008/0270110 | A1* | 10/2008 | Yurick ................ G06F 16/685 704/3 |
| 2010/0005061 | A1* | 1/2010 | Basco .................. G06F 16/355 704/9 |
| 2010/0306249 | A1 | 12/2010 | Hill |
| 2011/0035406 | A1 | 2/2011 | Petrou et al. |
| 2011/0038512 | A1 | 2/2011 | Petrou et al. |
| 2011/0125735 | A1 | 5/2011 | Petrou |
| 2011/0128288 | A1 | 6/2011 | Petrou et al. |
| 2011/0131241 | A1 | 6/2011 | Petrou et al. |
| 2011/0137895 | A1 | 6/2011 | Petrou et al. |
| 2012/0109858 | A1 | 5/2012 | Makadia et al. |
| 2012/0191745 | A1 | 7/2012 | Velipasaoglu et al. |
| 2012/0215533 | A1 | 8/2012 | Aravamudan et al. |
| 2013/0132361 | A1 | 5/2013 | Chen et al. |
| 2013/0218877 | A1* | 8/2013 | Satyanarayanan ...... H04L 51/04 707/723 |
| 2013/0346400 | A1 | 12/2013 | Ramsey et al. |
| 2014/0046935 | A1* | 2/2014 | Bengio ................ G06F 16/338 707/723 |
| 2014/0172881 | A1 | 6/2014 | Petrou et al. |
| 2015/0058318 | A1 | 2/2015 | Blackwell |
| 2016/0026709 | A1* | 1/2016 | Schiffer ............... G06K 9/6201 707/738 |
| 2016/0041982 | A1* | 2/2016 | He ..................... G06F 16/9535 707/728 |
| 2016/0171106 | A1* | 6/2016 | Song .................... G06F 16/951 707/709 |
| 2016/0334967 | A1* | 11/2016 | Rottler ................... H04L 67/10 |

OTHER PUBLICATIONS

U.S. Appl. No. 13/906,889, filed May 31, 2013, Heiler et al.

U.S. Appl. No. 14/313,519, filed Jun. 24, 2014, Bakir et al.

"10 Mobile Astronomy Apps for Stargazers," [online][Retrieved on Apr. 29, 2014]; Retrieved from the Internet URL: http://mashable.com/2011/06/21/astronomy-mobile-apps/, 2011, 13 pages.

"Google announces Search by Image and Voice Search for desktop, revamped mobile search," [online] Jun. 14, 2011 [Retrieved on Mar. 22, 2017] Retrieved from the Internet URL: https://www.engadget.com/2011/06/14/google-announces-search-by-image-search-by-voice-for-desktop/> 1 page.

"Google's Impressive "Conversational Search" Goes Live on Chrome," [online][Retrieved on May 5, 2014]; Retrieved from the Internet URL: http://searchengineland.com/googles-impressive-conversationa-search-goes-line-on-chrome-160445, 2013, 12 pages.

Zhang et al., "Probabilistic Query Rewriting for Efficient and Effective Keyword Search on Graph Data," Proceedings of the VLDB Endowment 6(14):1642-1653, 2013, 12 pages.

* cited by examiner

CONTEXTUAL INFORMATION FOR A DISPLAYED RESOURCE

BACKGROUND

This specification relates to providing contextual information to a user.

A device may provide a user with contextual information. For example, a device may display a web page about a particular subject, receive a search query from the user including search terms for the particular subject, retrieve search results responsive to the search query, and provide the search results to the user.

Typical interaction models require users to provide some form of a user query to a user device. For example, a user may be viewing an image of a particular piece of sporting equipment on a smart phone and state "show me reviews about this item." A search process then analyzes the image, and the query which is dependent on the image, to determine search parameters and execute a search of resources to identify resources that may satisfy the user's informational needs.

SUMMARY

In general, one innovative aspect of the subject matter described in this specification can be embodied in methods that include the actions of receiving, from a user device, a query-independent request for contextual information relevant to an active resource displayed in an application environment on the user device, identifying multiple search items from content in the resource, determining a relevance score for each of the multiple search items, selecting one or more of the multiple search items based on the relevance scores, and providing, to the user device for each of the selected one or more multiple search items, a respective contextual user interface element for display with the active resource, where each contextual user interface element includes contextual information regarding the respective search item. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Receiving, from a user device, a query-independent request for contextual information relevant to an active resource displayed in an application environment on the user device may include receiving, from the user device, a query-independent request that does not include one or more query terms entered by a user. Identifying multiple search items from the content in the resource may include extracting, from the query-independent request, a screenshot from the user device and using an image processing technique on the screenshot to obtain text in the resource. Identifying multiple search items from the content in the resource may include extracting, from the query-independent request, a data representation of the active resource and parsing the data representation of the active resource to obtain text in the resource. The data representation of the active resource may include a document object model. Determining a relevance score for each of the multiple search items may include determining, for each of the multiple search items, the relevance score for the search item based on an appearance of content from which the search item is identified. Determining, for each of the multiple search items, the relevance score for the search item based on an appearance of content from which the search item is identified may include determining the relevance score for the search item based on one or more of a size, color, or position of text from which the search item is identified. Selecting one or more of the multiple search items based on the relevance scores may include determining that the one or more of the multiple search items have respective relevance scores that satisfy a relevance threshold and in response to determining that the one or more of the multiple search items have respective relevance scores that satisfy the relevance threshold, selecting the one or more of the multiple search items. The resource may include one or more of a web page, an application page, or a textual conversation.

Particular embodiments of the subject matter described in this specification can be implemented so as to realize one or more of the following advantages. Contextual information that is likely to satisfy a user's informational need may be provided by a device to a user without the user providing a query to the device. This results in a convenient way for the user to obtain contextual information abased on a resource displayed on the device. In particular, the system enables the input of a query-independent request for contextual information that relevant to an active resource displayed on the user device in a fluid and intuitive manner. The user no longer needs to type in query terms or speak query terms to obtain contextual information. Accordingly, users are more likely to solicit contextual information as doing so can be accomplished in a manner that is not only convenient for the user, but also in a relatively discrete manner so that bystanders are not disturbed by the user speaking into the device. Also, because the user need not type in a query, the user may, in some implementations, solicit the information when the user would otherwise be unable to type effectively, e.g., when the user only has one hand free.

Also, because the input of the query-independent request for contextual information does not require a query input, the system does not need to perform text-to-speech processing or process typing input. This results in fewer input errors and erroneously input queries. Accordingly, when considered in the aggregate, thousands of erroneous and inaccurate queries are avoided, which in turn, provides a more efficient use of search system resources. In other words, multiple erroneous query processing cycles are avoided, which reduces processing resources required and reduces overall system bandwidth requirements (or, alternatively, enables a larger number of users to be serviced without a commensurate increase in processing resources). This improved in the technological field of search processing is thus another distinct advantage realized by the systems and methods described below.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

1.0 Overview

Sometimes a user may desire to receive additional information regarding the subject matter of a resource that the user is currently viewing on a device. For example, a user may be viewing a web page about good burger places that mentions "Paul's Diner" and may desire to obtain additional information about "Paul's Diner." The user may open a web page for a search engine, type in "Paul's Diner" as a search query, scroll through a search results listing, and then select a search result to view. However, this process may be time consuming and require multiple interactions by the user.

Described below are systems and methods for providing contextual information for a displayed resource. Instead of providing contextual information based on a query entered by a user, the system may provide contextual information for a displayed resource and independent of a query input. To provide the contextual information, the system may detect that a user desires contextual information. For example, a user viewing a webpage about highly rated burger places that mentions "Paul's Diner" may press a button for three seconds to indicate that the user wishes to receive contextual information based on the displayed webpage. The system may detect the indication and, in response, identify search items from the text in the displayed resource and then provide contextual information about the identified search items to the user. For example, the system may identify that the text "Paul's Diner" that appears in the resource matches with a restaurant named "Paul's Diner," and in response, provide the user a short description, an address, and a phone number for "Paul's Diner."

1.1 Example Operating Environment

Figure 1A:
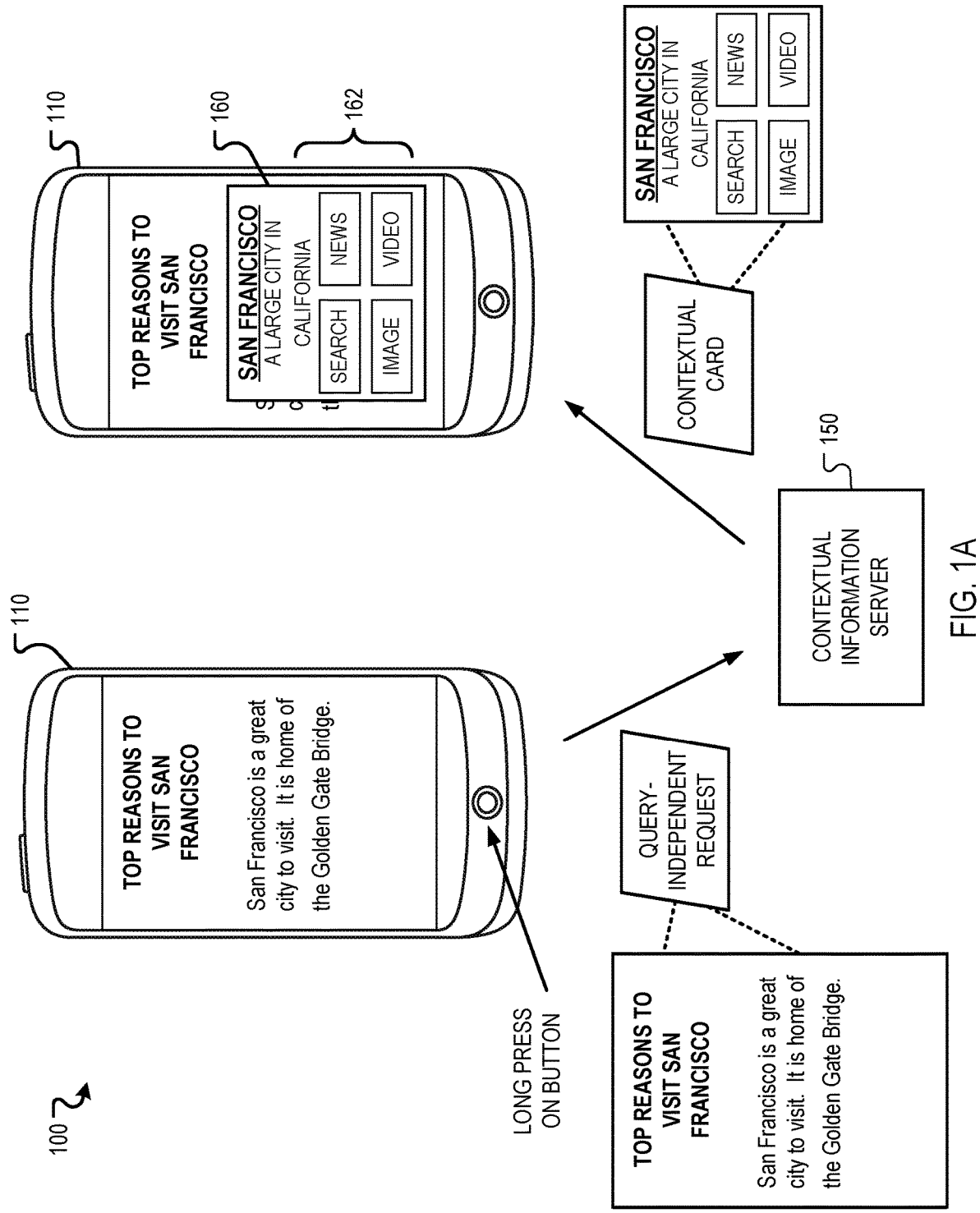
FIGS. 1A and 1B are block diagrams of example environments in which contextual information is provided for a displayed resource.

FIG. 1A is a block diagram of an example environment 100 in which contextual information is provided for a displayed resource. The environment 100 includes a user device 110 and a contextual information server 150.

A user device 110 is used by a user to obtain contextual information for a displayed resource. The user device 110 is an electronic device that is capable of requesting and receiving resources over the network. Example user devices 110 include personal computers (e.g., desktops or laptops), mobile communication devices (e.g., smart phones or tablets), and other devices that can send and receive data over the network (e.g., televisions, and glasses or watches with network communication functionality). A user device typically includes a user application, e.g., a web browser, to facilitate the sending and receiving of data over the network. The web browser can enable a user to display and interact with text, images, videos, music and other information typically located on a web page at a website on the World Wide Web or a local area network. The user device 110 may use any appropriate application to send and receive data over the network and present requested resources to a user.

A resource is data that includes content that can be visibly rendered by the user device 110. For example, resources may include HTML pages, electronic documents, images files, video files, text message conversations, e-mails, graphical user interfaces of applications, etc. An active resource may be considered a resource that is currently being displayed on the user device 110. Typically, the active resource is rendered by an application that is running in a foreground of a user device.

The user device 110 detects that a user desires contextual information for a displayed resource. For example, the user device 110 may be displaying a resource hosted by a website, where the resource describes reasons for visiting San Francisco. The user may generate an indication for contextual information, e.g., by pressing a button for three seconds or tapping the screen according to a predefined tap patter, etc. Assume for illustrative purposes the user performs a long press that indicates that the user desires contextual information for a displayed resource. In response, the user device 110 provides a request to the contextual information server 150 for contextual information for the displayed resource. For example, the user device 110 may provide a request that includes a screenshot of the currently displayed portion of the active resource, where the portion includes the text "San Francisco," or the text of the active resource, the URI of the resources, etc.

The request may be considered a query-independent request as the user device 110 provides the request to the contextual information server 150 without having the user enter terms for a query, whether verbally, physically, or some other interaction. For example, after the user device 110 detects that a user has long pressed a button, the user device 110 may provide the request to the contextual information server 150 without requesting additional information from the user.

In response to providing the request to the contextual information server 150, the user device 110 then receives one or more user interface elements from the contextual information server 150. For example, the user device 110 may receive a user interface element for "San Francisco" from the contextual information server 150. For the purposes of illustration, the user interface elements are described as cards. However, other user interface elements may be used, for example, chat bubbles, selectable linked notes or footnotes, synthesized voice responses, or other forms. A contextual card may be data that includes contextual information about a search item. For example, a context card for "San Francisco" may include contextual information that describes that "San Francisco" is "A large city in California." The contextual card may indicate next actions. For example, the contextual card for "San Francisco" may include selectable options for performing searches for web pages, news, images, or videos relevant to a query including the terms "San Francisco."

By way of another example, the selectable options may be dependent on the information displayed in the active resource. For example, in the context of a travel-related resource, the options may be travel related options. In the context of an encyclopedic resource, the options may relate to popular informational searches, such as "Population demographics," "City Government," etc. The contextual information server 150 can, for example, identify options that are most relevant to the particular context of the information displayed in the active resource.

The user device 110 provides the received contextual cards to the user. For example, the user device 110 may generate a graphical panel 160 that is shown overlaid on top of the displayed resource where the graphical panel 160 identifies that the graphical panel is for the item "San Francisco" and San Francisco is "A large city in California," includes selectable options 162 for performing searches for web pages, news, images, or videos relevant to a query including the terms "San Francisco." While shown as distinct categories of functionality, selectable options 162 may relate to the same underlying functionality as one another, but be different applications for performing that functionality. For example, the selectable options 162 may be for a first video playing application, a second, different video playing application, and additional, different video playing applications. In another example, the user device 110 may stop displaying the resource and instead display the graphical panel 160. The user device 110 may enable the user to quickly return to the displayed resource. For example, the user device 110 may stop displaying the graphical panel 160 in response to detecting that a user has interacted with, e.g., clicked or touched, a portion of the resource that is not overlaid by the graphical panel 160. In another example, the user device 110 may stop displaying the graphical panel 160 and display the resource in response to detecting that a user has interacted with, e.g., clicked or touched, a selectable option for closing the graphical panel 160.

Figure 1B:
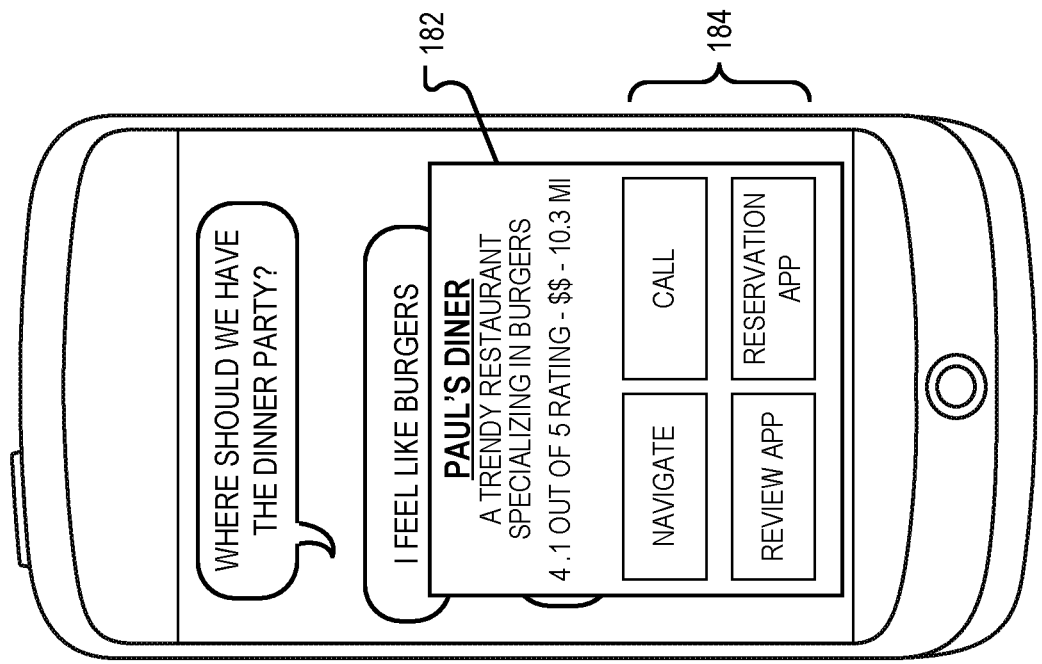

FIG. 1B is a block diagram of another example environment 180 in which contextual information is provided for a displayed resource. The contextual information server 150 may identify suggested functionality, e.g., functionality provided through applications on the user device 110, associated with the contextual content. For example, the contextual information server 150 may identify a contextual card for the restaurant "Paul's Diner" and then identify that suggested functionality for restaurants is using a navigation application to obtain directions to the restaurant, using a calling application to call the restaurant, using a review application to view reviews for the restaurant, and using a reservation application to make a reservation at the website. The contextual information server 150 may include in a contextual card 160 selectable options 162 that each correspond to one of the suggested functionalities. For example, the contextual information server 150 may include a selectable option for opening a navigation application with the address of "Paul's Diner" as the destination address, a selectable option for opening a calling application with the phone number of "Paul's Diner" as the phone number to call, a selectable option for opening a review application with "Paul's Diner" as the restaurant to view reviews, and a selectable option for opening a reservation application with "Paul's Diner" as the restaurant at which to make a reservation.

1.2 Example System

Figure 1B:
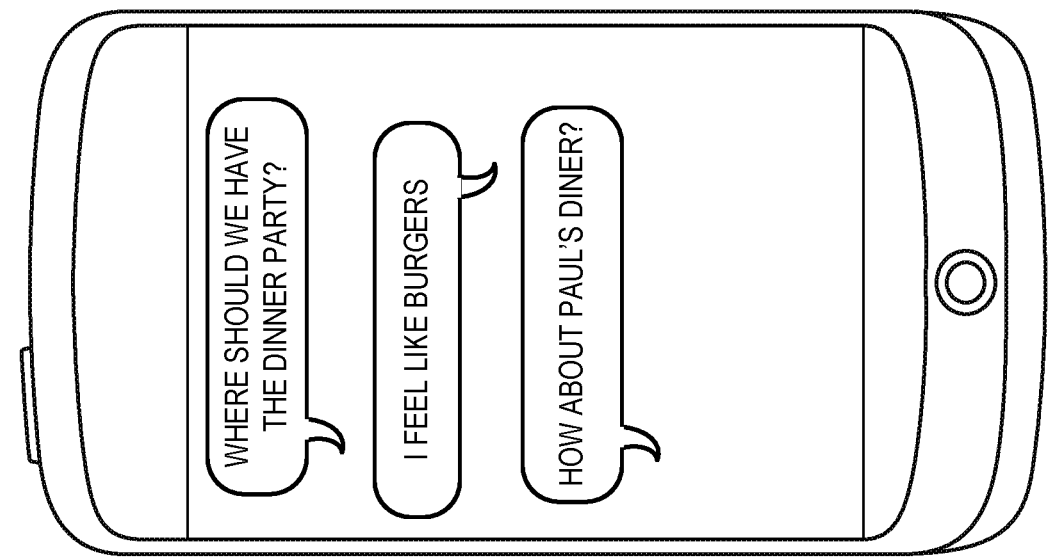
Figure 2:
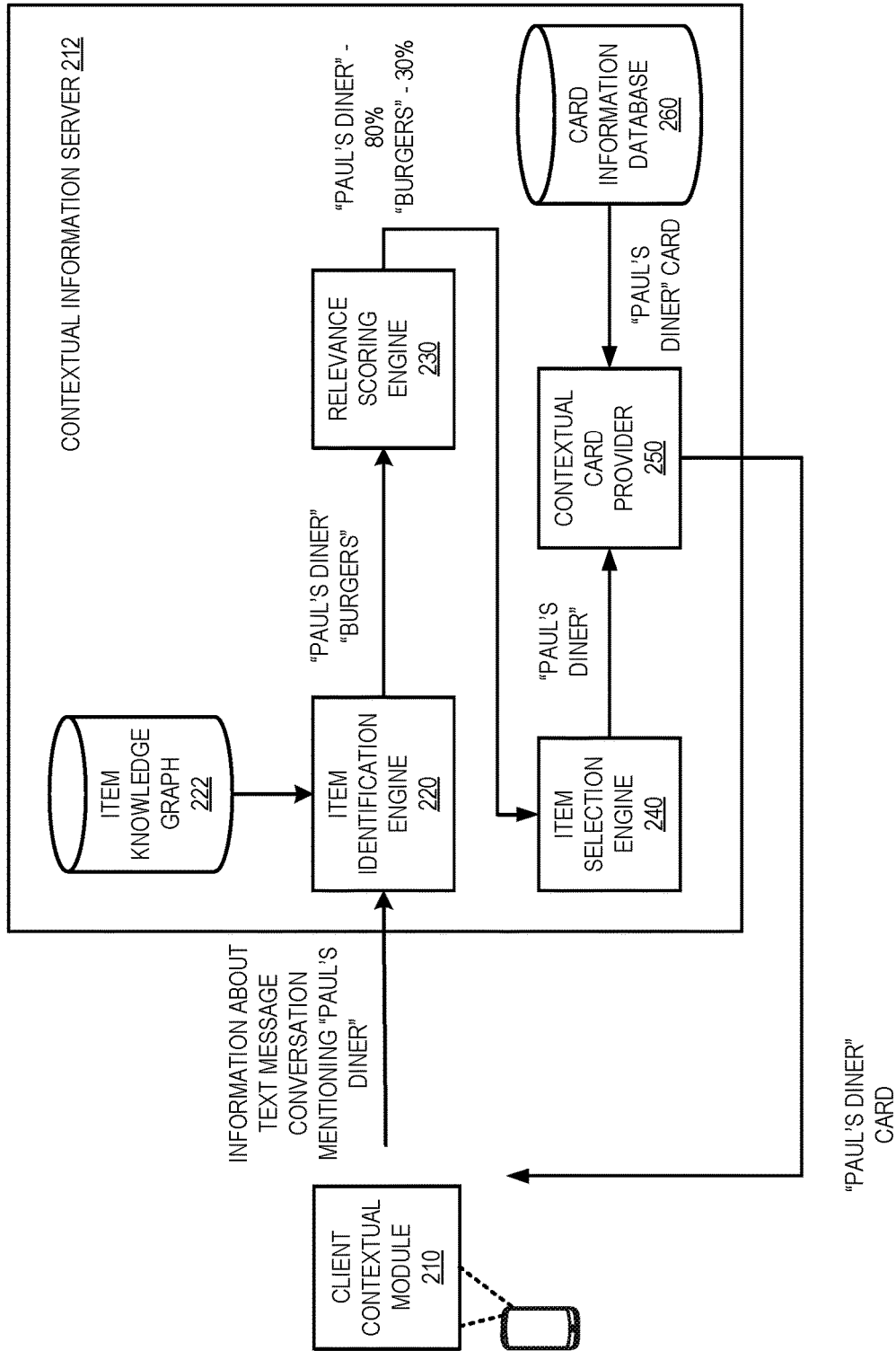
FIG. 2 is a block diagram of another example environment in which contextual information is provided for a displayed resource.

FIG. 2 is a block diagram of another example environment 200 in which contextual information is provided for a displayed resource. The environment 200 includes a client contextual module 210 on a user device and a contextual information server 212. The contextual information server 212 includes an item identification engine 220, an item knowledge graph 222, a relevance scoring engine 230, an item selection engine 240, a contextual card provider 250, and a card information database 260. In some implementations, the client contextual module 210 may be provided on the user device 110 shown in FIG. 1. In other implementations, the client contextual module 210 may be provided on another user device different than the user device 110 shown in FIG. 1. In some implementations, the contextual information server 212 may be the contextual information server 150 shown in FIG. 1. In other implementations, contextual information server 212 may be different than the contextual information server 150 shown in FIG. 1.

The client contextual module 210 determines that a user desires contextual information for a displayed resource. For example, the client contextual module 210 may determine that a user has rapidly pressed a button three times when viewing a resource of a text message conversation that includes the text messages "LET'S GET SOME BURGERS" and "HOW ABOUT PAUL'S DINER" (in this example, rapidly pressing the button three times indicates that the user desires contextual information). In response to determining that a user desires contextual information for a displayed resource, the client contextual module 210 generates a request to the contextual information server 212 for contextual information for the displayed resource. For example, the client contextual module 210 may generate a request to the contextual information server 212 for contextual information for the text message conversation that includes the text messages "LET'S GET SOME BURGERS" and "HOW ABOUT PAUL'S DINER."

The client contextual module 120 may include information about the displayed resource in the request. For example, the client contextual module 210 may generate a screenshot that is an image showing the text message conversation and include the screenshot in the request. In another example, the client contextual module 210 by request that the operating system of the user device 110 provide a tree based document object model that defines what is currently being rendered in an application that is in a foreground and include the model in the request. The document object model may define text that appears in the displayed resource and the appearance of the text, e.g., size, color, position, font, or other formatting, of the text.

In some implementations, the client contextual module 120 may include the information about the displayed resource in the request by additionally or alternatively determining additional information about the request and including the additional information in the request. The additional information about the request may include one or more of a uniform resource locator (URL) for the displayed resource, metadata describing the displayed resource, a location of the user device 110, a portion not currently displayed of the resource, or an identity of the user. For example, the client contextual module 120 may determine that the user device 110 is located in Atlanta and include a location of "Atlanta" in the request.

The client contextual module 120 then provides the request to the item identification engine 220 without the user entering a query. For example, the client contextual module 120 provides the request to the item identification engine 220 in response to the user providing the indication that the user desires contextual information for the displayed resource, e.g., three rapid button presses, a long button press, or some other indication, without the user providing any further information, e.g., query terms, after providing the indication.

In response to providing the request to the item identification engine 220, the client contextual module 120 receives a contextual card and renders the contextual card. For example, the client contextual module 120 receives a contextual card for the restaurant "PAUL'S DINER" that includes a description, an address, a phone number for "PAUL'S DINER," and a selectable option for performing the action of making a reservation, and then renders the contextual card on top of the text message conversation.

The item identification engine 220 receives the request for contextual information for a displayed resource and identifies one or more search items from the content in the displayed resource. For example, the item identification engine 220 may obtain a request that includes a screenshot of the text message conversation mentioning "PAUL'S DINER" and then identify the restaurant "PAUL's DINER" and the food "BURGERS" as search items. In another example, the item identification engine 220 may obtain a request that includes a document object model of the text message conversation mentioning "PAUL'S DINER" and then identify the restaurant "PAUL's DINER" and the food "BURGERS" as search items. As used in this specification, a "search item" is a concept or thing that can be used by a search system to conduct a search of information. A search item may be referred to by a text fragment, e.g., a term or phrase, and search items are distinguishable from one another, e.g., based on context. For example, a search item may be a keyword, and instance of a particular entity, a proper name, an entity or relation modeled by a node or an edge in a knowledge graph, and the like.

The item identification engine 220 may extract text from the request. For example, the item identification engine 220 may extract the text "LET'S GET SOME BURGERS" and "HOW ABOUT PAUL'S DINER" from the request. The item identification engine 220 may extract the text by performing image processing on the request. For example, the item identification engine 220 may obtain a screenshot in the request and perform optical character recognition to identify the text "LET'S GET SOME BURGERS" and "HOW ABOUT PAUL'S DINER" is displayed and that "LET'S GET SOME BURGERS" is displayed above "HOW ABOUT PAUL'S DINER." The item identification engine 220 may additionally or alternatively extract text by parsing a document object model included in the request. For example, the item identification engine 220 may parse the model to determine that "HOW ABOUT PAUL'S DINER" is displayed and that "LET'S GET SOME BURGERS" is displayed above "HOW ABOUT PAUL'S DINER." In some implementations, the item identification engine 220 may further determine an appearance of the text within the screenshot. For example, the item identification engine 220 may determine one or more of size, color, font, position, or other formatting of text based on a screenshot or a document object model. In the case of images, the item identification engine 220 may perform visual analysis of the image to identify text, objects, etc.

The item identification engine 220 identifies the one or more search items from the extracted text using the item knowledge graph 222. For example, the item identification engine 220 may identify that the text "PAUL'S DINER" in the text message conversation matches the name of a restaurant "PAUL'S DINER" in the item knowledge graph 222 and the text "BURGER" in the text message conversation matches the name of a food item "BURGER" in the item knowledge graph 222. The item knowledge graph 222 may be a knowledge graph that includes nodes for search items, edges that indicate relationships between the nodes, and contextual information describing the search items represented by the nodes.

In some implementations, the item identification engine 220 may identify the one or more search items from the extracted text based on additional information in the request. For example, the item identification engine 220 may determine that the request indicates that user device 110 is in Atlanta, e.g., based on geo-location data associated with the request or the user device, and focus on search items located in Atlanta. In another example, the item identification engine 220 may determine that the request indicates that the request is from "User A" and focus on search items for which "User A" has received information for during the last hour, day, week, month, or some other period of time.

In some implementations, the item identification engine 220 may identify the one or more search items from the extracted text based on natural language processing. For example, the item identification engine 220 may extract the text "HOW ABOUT BURGERS AT PAUL'S SOMETHING" and "DO YOU MEAN DINER" and identify the restaurant "PAUL'S DINER" as corresponding to the extracted text. Similarly, the item identification engine 220 may also account of spelling, grammatical, or optical character recognition mistakes in identifying search items.

The item identification engine 220 may identify search items based on generating match scores between items in the knowledge graph 222 and the extracted text. The match scores may reflect a confidence of a match between text and a search item. For example, the item identification engine 220 may generate a match score of 100% for the extracted text "PAUL'S DINER" and the restaurant "PAUL'S DINER" which indicates a high degree of confidence that there is a match. In another example, the item identification engine 220 may generate a match score of 60% between the extracted text "PAUL'S DINER" and the restaurant "PAUL DINER" which indicates a moderate degree of confidence that there is a match. The item identification engine 220 may identify search items that satisfy a match threshold. For example, the item identification engine 220 may identify search items where a match score is above 75%, 85%, 90%, or some other threshold.

The relevance scoring engine 230 may receive the search items identified by the item identification engine 220 and determine a relevance score for each of the search items. The relevance score may reflect a confidence that the search item is relevant to the user, i.e., a degree of confidence that the user would like to see contextual information about the search item. For example, the relevance scoring engine 230 may receive an indication that the search items restaurant "PAUL'S DINER" and food "BURGERS" were identified in the displayed resource, determine a relevance score of 80% for the restaurant "PAUL'S DINER" indicating a high degree of confidence that the user would like to see contextual information about the restaurant "PAUL'S DINER," and determine a relevance score of 30% for the food "BURGERS" indicating a low degree of confidence that the user would like to see contextual information about the food item "BURGERS."

The relevance scoring engine 230 may determine a relevance score for a search item based on an appearance of the text from which the search item was identified. For example, the relevance scoring engine 230 may determine that the displayed resource is a text message conversation and, in response, determine relevance scores that reflect a higher degree of confidence for search items identified from text that appears closer to the bottom of a screen as that text may be included in more recent messages. In another example, the relevance scoring engine 230 may determine that the displayed resource is a web page and, in response, determine relevance scores that reflect a higher degree of confidence for search items identified from text that appears closer to the top of a screen as that text may be more relevant to the web page.

In yet another example, the relevance scoring engine 230 may determine relevance scores that reflect a higher degree of confidence for search items identified from text that is centered as that text may be centered because the text is important. In still another example, the relevance scoring engine 230 may determine relevance scores that reflect a higher degree of confidence for search items identified from text that is bolded as the text may be bolded because the text is important. In another example, the relevance scoring engine 230 may determine relevance scores that reflect a higher degree of confidence for search items identified from text that is a larger size, a different color, or aligned differently from the majority of displayed text because different appearance of the text may indicate that the text is important.

Additionally or alternatively, the relevance scoring engine 230 may determine a relevance score for a search item based on a number of times text corresponding to the search item appears in the displayed resource. For example, a search item that is identified twice from text that appears in a screenshot may have twice the relevance score of a search item that is identified once from text in a screenshot.

In some implementations, the relevance scoring engine 230 may determine relevance scores that reflect a lower degree of confidence for search items identified from text that is determined to be not important. For example, the relevance scoring engine 230 may determine that text in a menu bar is not important, so when determining that the text "Home" from which the item "Home" is identified is from a menu bar of a web browser, determine a relevance score that reflects a lower degree of confidence of relevance for the search item "Home." In another example, the relevance scoring engine 230 may determine that text that appears in an advertisement is not important, so when determining that the text "Widget X" from which the item "Widget X" is identified is in an advertisement for "Widget X" that is displayed on a web page, determine a relevance score that reflects a lower degree of confidence of relevance for the item "Widget X."

The item selection engine 240 may obtain the relevance scores and select one or more search items for which to provide contextual information to the user. For example, the item selection engine 240 may receive an identification of the restaurant "PAUL'S DINER" labeled with a relevance score of 80% and an identification of the food "BURGER" labeled with the relevance score of 30% and, in response, select the restaurant "PAUL'S DINER" and not select the food "BURGER" to provide contextual information.

The item selection engine 240 may select the search items based on determining whether the search items have respective relevance scores that satisfy a relevance threshold. For example, the item selection engine 240 may select the restaurant "PAUL'S DINER" as the relevance score of 80% is greater than a relevance threshold of 50%, 65%, 70%, or some other percentage less than 80%. In another example, the item selection engine 240 may not select the food "BURGER" as the relevance score of 30% is lower than a relevance threshold of 50%, 65%, 90%, or some other percentage above 30%.

In some implementations, the item selection engine 240 may additionally or alternatively select the search items based on a maximum. For example, the item selection engine 240 may select a maximum of one, two, four, or some other number of cards and select the maximum number of search items with relevance scores that reflect the greatest degree of confidence in relevance. In some implementations, the item selection engine 240 may additionally or alternatively select the search items based on a minimum. For example, the item selection engine 240 may select a minimum of one, two, four, or some other number of cards with relevance scores that reflect the greatest degree of confidence in relevance.

In implementations where the item identification engine 220 determines match scores that reflect a confidence of a degree of match between items and text in the displayed resource, the item selection engine 240 may additionally select the search items based on the match scores. For example, the item selection engine 240 may weigh the relevance scores for search items based on the match scores so that match scores for search items that reflect a lower degree of confidence of a match weight the relevance scores corresponding to those search items to reflect a lower degree of confidence of relevance.

The contextual card provider 250 may obtain contextual cards including contextual information for the selected search items and provide the contextual cards to the client contextual module 210. For example, the contextual card provider 250 may obtain an identification of the restaurant "PAUL'S DINER" from the item selection engine 240 and provide a contextual card for "PAUL'S DINER" to the client contextual module 210, where the contextual card includes a brief description, address, phone number for "PAUL'S DINER" and a selectable option for making a reservation at "PAUL'S DINER".

The contextual card provider 250 may obtain contextual cards by generating contextual cards for search items. For example, the contextual card provider 250 may obtain a description, title, phone number, and reservation information for the restaurant "PAUL'S DINER" from the item knowledge graph 222 and then generate a context card that includes the description, title, phone number and a selection option for making a reservation at "PAUL'S DINER."

In some implementations, in generating the contextual cards, the contextual card provider 250 may identify suggested functionality associated with the search items. For example, the contextual card provider 250 may determine that for the restaurant, "PAUL'S DINER," suggested functionality is navigating, calling, viewing reviews, and making a reservation, and in response, generate a contextual card for "PAUL'S DINER" that includes selectable options that each correspond to one of those functionalities. The contextual card provider 250 may identify the suggested functionality from the item knowledge graph 222. For example, the item knowledge graph 222 may indicate that for "PAUL'S DINER," suggested functionality is navigating, calling, viewing reviews, and making a reservation. In another example, the item knowledge graph 222 may indicate that "PAUL'S DINER" is a restaurant and default suggested functionality for restaurants are navigating, calling, viewing reviews, and making a reservation. In yet another example, the contextual card provider 250 may determine that address and phone number information are available from the item knowledge graph 222 for "PAUL'S DINER" and, in response, determine to include navigating and calling functionality in the contextual card.

In some implementations, before generating a contextual card for a search item, the contextual card provider 250 may determine whether a contextual card for the search item already exists in a card information database 260. For example, the contextual card provider 250 may query the card information database 260 for a contextual card for the restaurant "PAUL'S DINER." Where the card information database 260 includes an existing contextual card for the search item, the card information database 260 may provide the contextual card to the contextual card provider 250 so that the context card provider 250 can provide the existing contextual card to the client contextual module 210 instead of generating a new contextual card.

Where the card information database 260 does not include an existing contextual card for the search item, the card information database 260 may provide an indication to the contextual card provider 250 that a contextual card for the search item does not exist, the contextual card provider 250 may generate the card, and provide the generated contextual card for storage in the card information database 260.

In some implementations, the card information database 260 may remove existing cards. For example, the card information database 260 may delete cards after a respective predetermined amount of time, e.g., one hour, one day, one week, one month, or some other length of time, after the cards are generated.

2.0 Example Process Flow

Figure 3:
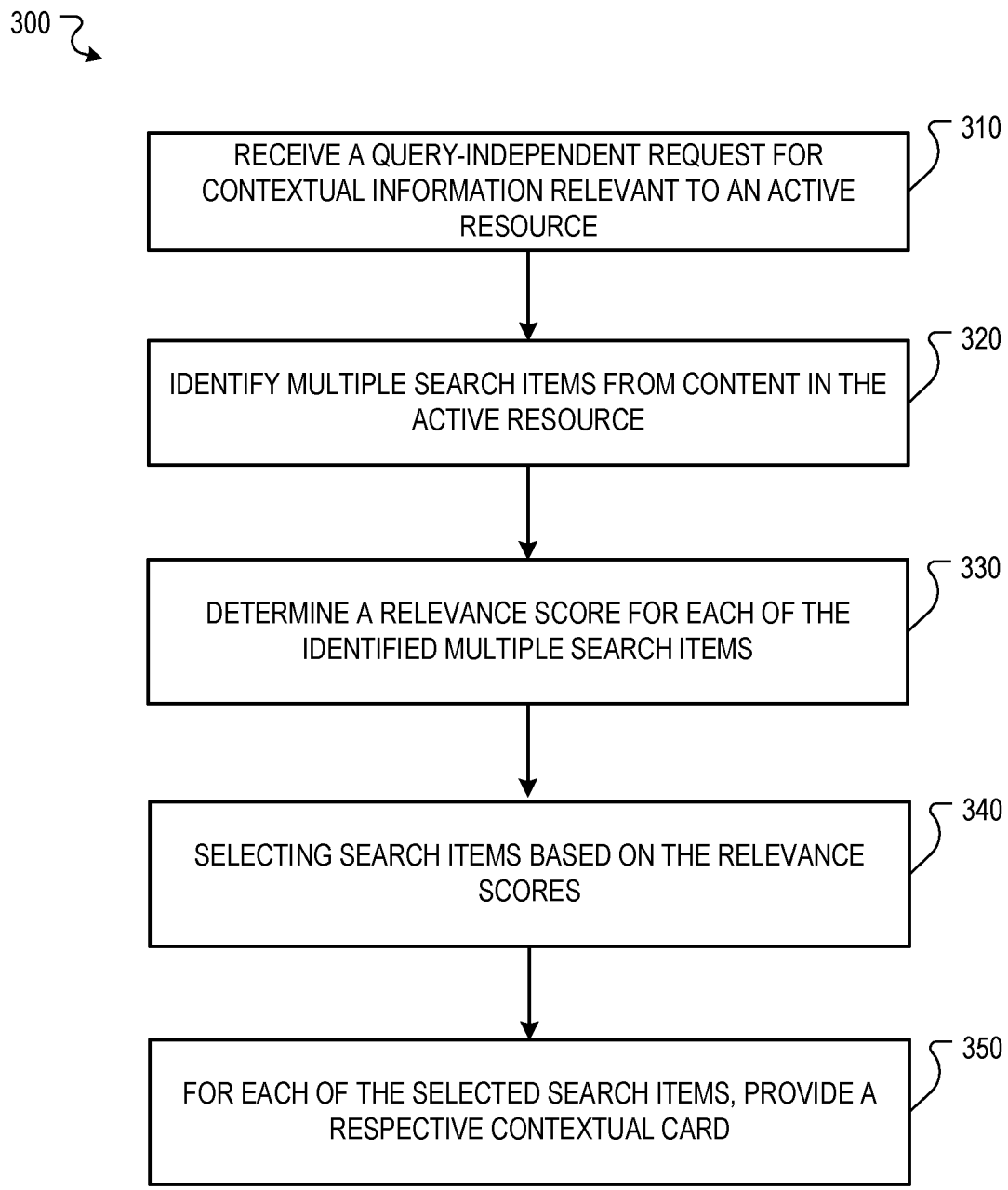
FIG. 3 is a flow diagram of an example process for providing contextual information for a displayed resource.

FIG. 3 is a flow diagram of a process 300 for providing contextual information for a displayed resource. For example, the process 300 can be used by the contextual information server 212 from the environment 200.

The process 300 includes receiving a query-independent request for contextual information relevant to an active resource (310). For example, the item identification engine 220 may receive a request that includes a document object model that defines (i) text of an e-mail and (ii) how the text is currently being displayed on a user device. In another example, the item identification engine 220 may receive a request that includes a screenshot of an e-mail being displayed on a user device.

The process 300 includes identifying multiple search items from content in the active resource (320). For example, the item identification engine 220 may extract the text "I just saw Celebrity X at Store Y. Celebrity X even looked at me!" from the e-mail and identify a person "Celebrity X" from the text "Celebrity X" and a place of business "Store Y" from the text "Store Y."

The process 300 includes determining a relevance score for each of the identified multiple search items (330). For example, the relevance scoring engine 230 may receive an identification of the person "Celebrity X" and that the person "Celebrity X" corresponds to the two occurrences of the text "Celebrity X" in the e-mail and an identification of the place of business "Store Y" and that the place of business "Store Y" corresponds to the text "Store Y" in the e-mail. In response, the relevance scoring engine 230 may determine a relevance score of 66% for the person "Celebrity X" based on the text for the person appearing twice and a relevance score of 33% for the place of business "Store Y" based on the text for the place of business appearing once.

The process 300 includes selecting search items based on the relevance scores (340). For example, the item selection engine 240 may select person "Celebrity X" for providing contextual information based on the relevance score of 66% for the person satisfying a relevance threshold of 60% and not select the place of business "Store Y" based on the relevance score of 33% for the place of business not satisfying the relevance threshold of 60%.

The process 300 includes, for each of the selected search items, providing a respective contextual card (350). For example, the contextual card provider 250 may generate a contextual card for the person "Celebrity X" and provide the contextual card to the client contextual module 210.

In some implementations, the process 300 can include additional steps, fewer steps, or some of the steps can be divided into multiple steps. For example, the contextual information server 212 may not perform steps 330 and 340 and instead provide contextual cards for each identified search item.

3.0 Interaction Diagram

Figure 4:
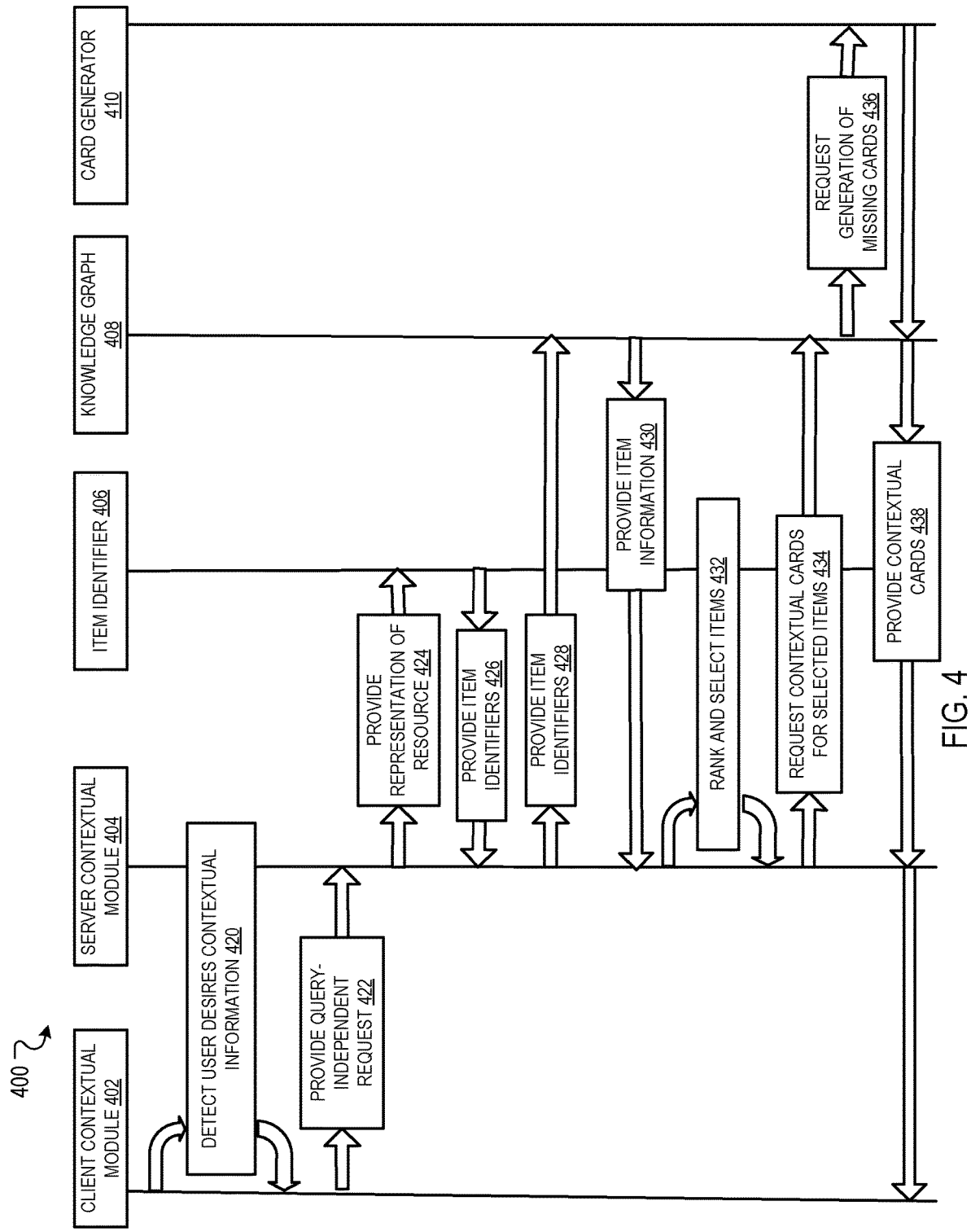
FIG. 4 is an interaction diagram of an example interaction in an environment in which contextual information is provided for a displayed resource.

FIG. 4 is an interaction diagram of an example interaction 400 in an environment in which contextual information is provided for a displayed resource. The interaction 400 is among a client contextual module 402, a server contextual module 404, an item identifier 406, a knowledge graph 408, and a card generator 410. In some implementations, the client contextual module 402 may be similar in functionality to the client contextual module 210, item identifier 406 may be similar in functionality to the item identification engine 220, the knowledge graph 408 may be similar in functionality to the item knowledge graph 222, and the card generator 410 may be similar in functionality to the contextual card provider 250.

Initially, interaction 400 includes detecting that a user desires contextual information (420). For example, the client contextual module 402 may detect that a user has long pressed a button to indicate that the user desires contextual information for a displayed article about baseball "Player X." The interaction 400 includes providing a query-independent request 422 to the server contextual module 404 (422). For example, in response to detecting that the user desires contextual information, the client contextual module 402 may provide a request that includes one or more of a screenshot or a document object model of the article about baseball "Player X" to the server contextual module 404.

The interaction 400 includes providing a representation of the resource (424). For example, the server contextual module 404 may provide one or more of the screenshot or the document object model of the article about baseball "Player X" to the item identifier 406. The interaction 400 includes providing item identifiers (426). For example, the item identifier 406 may identify that text of "baseball" corresponds to an item for the sport "Baseball" with the identifier "54267" and that the text of "Player X" corresponds to an item for the person "Player X" with the identifier "12876," and provide the identifiers "54267" and "12876" to the server contextual module 404.

The interaction 400 includes providing item identifiers (428). For example, the server contextual module 404 may provide the item identifiers "54267" and "12876" to the knowledge graph 408. The interaction 400 includes providing item information (430). For example, the knowledge graph 408 may provide the server contextual module 404 information regarding the sport "Baseball" and the person "Player X."

The interaction 400 includes ranking and selecting items (432). For example, the server contextual module 404 may determine relevance scores for the sport "Baseball" and the person "Player X" based on text from which the sport and person are identified, and then select to provide a contextual card for person "Player X" and not sport "Baseball."

The interaction 400 includes requesting contextual cards for the selected items (434). For example, the server contextual module 404 may provide a request to the knowledge graph 408 for a contextual card for the item with the identifier "12876," e.g., the identifier for the person "Player X." The interaction 400 includes requesting generation of missing contextual cards (436). For example, the knowledge graph 408 may determine that the knowledge graph 408 does not have a contextual card for the person "Player X" and, in response, provide a request to the card generator 410 for a contextual card including contextual information included in the knowledge graph 408 for the person "Player X." The interaction 400 includes providing contextual cards (438). For example, the card generator 410 may provide the contextual card for person "Player X" to the knowledge graph 408, the knowledge graph 408 may store the contextual card and provide the contextual card to the server contextual module 404, and the server contextual module 404 may then provide the contextual card to the client contextual module 402.

4.0 Additional Implementation Details

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

Figure 5:
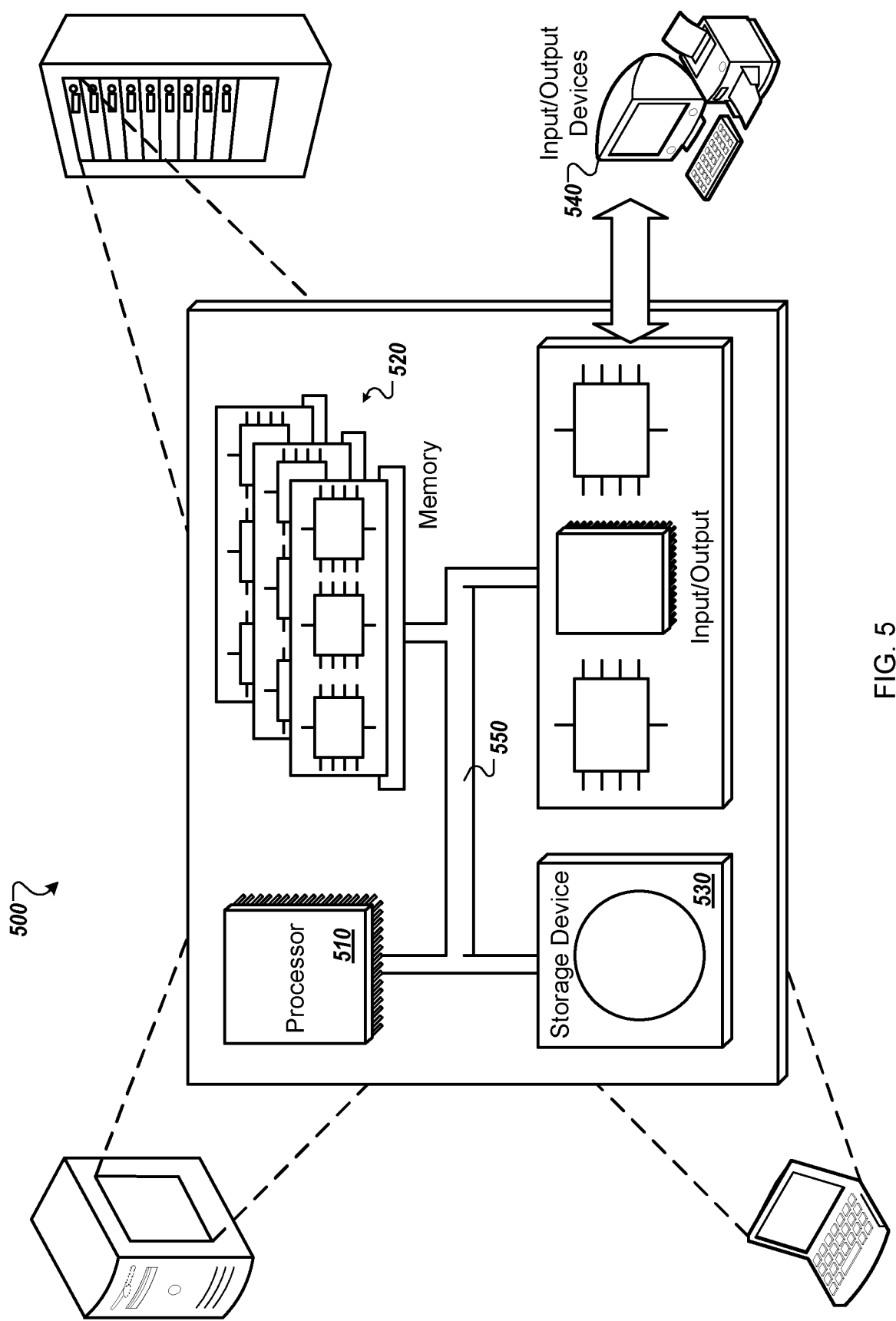
FIG. 5 is a schematic diagram of a computer system.

An example of one such type of computer is shown in FIG. 5, which shows a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a data processing apparatus, the method comprising:
    receiving, from a user device, a query-independent request generated in response to an indication by a user on the user device for contextual information relevant to an active resource displayed in an application environment on the user device, wherein:
        the query-independent request is a request that does not include query parameters entered by the user, and
        the active resource includes content that can be visibly rendered in the application environment on the user device, wherein the content that can be visibly rendered is rendered in the application environment of an application that is running in a foreground of the user device in a first portion of content currently displayed on a display of the user device, and in a second portion of content that is not currently displayed on the display of the user device;

identifying multiple search items from content in the active resource, the identifying comprising:
    selecting only the first portion of content currently displayed on the user device; and
    determining, from only the first portion of content, the multiple search items;
determining a type of the active resource displayed on the display from among multiple different types of active resources including a textual conversation and a web page;
determining a relevance score for each of the multiple search items based on the type determined of the active resource, wherein:
    the relevance score reflects a degree of confidence that the user would like to see contextual information about the search item,
    the relevance score is determined further based on a location, on the display of the user device, of displayed text that corresponds to the search item, and
    the relevance scores determined for search items corresponding to displayed text in certain locations on the display reflect a higher degree of confidence that the user would like to see the corresponding contextual information than relevance scores determined for search items corresponding to displayed text in other locations on the display, wherein the certain locations and the other locations differ depending on the type determined of the active resource;
selecting one or more of the multiple search items based on the relevance scores; and
providing, to the user device for each of the selected one or more multiple search items, a respective contextual user interface element for display with the active resource, wherein each contextual user interface element includes contextual information regarding the respective search item.

2. The method of claim 1, wherein identifying multiple search items from the content in the active resource comprises:
    extracting, from the query-independent request, a screenshot from the user device; and
    using an image processing technique on the screenshot to obtain text in the active resource.

3. The method of claim 1, wherein identifying multiple search items from the content in the active resource comprises:
    extracting, from the query-independent request, a data representation of the active resource; and
    parsing the data representation of the active resource to obtain text in the active resource.

4. The method of claim 3, wherein the data representation of the active resource comprises a document object model.

5. The method of claim 1, wherein determining a relevance score for each of the multiple search items comprises:
    determining, for each of the multiple search items, the relevance score for the search item based on an appearance of content from which the search item is identified.

6. The method of claim 5, wherein determining, for each of the multiple search items, the relevance score for the search item based on an appearance of content from which the search item is identified comprises:
    determining the relevance score for the search item based on one or more of a size, color, or position of text from which the search item is identified.

7. The method of claim 1, wherein selecting one or more of the multiple search items based on the relevance scores comprises:
    determining that the one or more of the multiple search items have respective relevance scores that satisfy a relevance threshold; and
    in response to determining that the one or more of the multiple search items have respective relevance scores that satisfy the relevance threshold, selecting the one or more of the multiple search items.

8. The method of claim 1, wherein the active resource comprises one or more of a web page, an application page, or a textual conversation.

9. A system comprising:
    a data processing apparatus; and
    a non-transitory computer readable storage medium in data communication with the data processing apparatus and storing instructions executable by the data processing apparatus and upon such execution cause the data processing apparatus to perform operations comprising:
receiving, from a user device, a query-independent request generated in response to an indication by a user on the user device for contextual information relevant to an active resource displayed in an application environment on the user device, wherein:
    the query-independent request is a request that does not include query parameters entered by the user, and
    the active resource includes content that can be visibly rendered in the application environment on the user device, wherein the content that can be visibly rendered is rendered in the application environment of an application that is running in a foreground of the user device in a first portion of content currently displayed on a display of the user device, and in a second portion of content that is not currently displayed on the display of the user device;
identifying multiple search items from content in the active resource, the identifying comprising:
    selecting only the first portion of content currently displayed on the user device; and
    determining, from only the first portion of content, the multiple search items;
determining a type of the active resource displayed on the display from among multiple different types of active resources including a textual conversation and a web page;
determining a relevance score for each of the multiple search items based on the type determined of the active resource, wherein:
    the relevance score reflects a degree of confidence that the user would like to see contextual information about the search item,
    the relevance score is determined further based on a location, on the display of the user device, of displayed text that corresponds to the search item, and
    the relevance scores determined for search items corresponding to displayed text in certain locations on the display reflect a higher degree of confidence that the user would like to see the corresponding contextual information than relevance scores determined for search items corresponding to displayed text in other locations on the display, wherein the certain locations and the other locations differ depending on the type determined of the active resource;
selecting one or more of the multiple search items based on the relevance scores; and providing, to the user device for each of the selected one or more multiple search items, a respective contextual user interface element for display with the active resource, wherein each contextual user interface element includes contextual information regarding the respective search item.

10. The system of claim 9, wherein identifying multiple search items from the content in the active resource comprises:
   extracting, from the query-independent request, a screenshot from the user device; and
   using an image processing technique on the screenshot to obtain text in the active resource.

11. The system of claim 9, wherein identifying multiple search items from the content in the active resource comprises:
   extracting, from the query-independent request, a data representation of the active resource; and
   parsing the data representation of the active resource to obtain text in the active resource.

12. The system of claim 11, wherein the data representation of the active resource comprises a document object model.

13. The system of claim 9, wherein determining a relevance score for each of the multiple search items comprises:
   determining, for each of the multiple search items, the relevance score for the search item based on an appearance of content from which the search item is identified.

14. The system of claim 13, wherein determining, for each of the multiple search items, the relevance score for the search item based on an appearance of content from which the search item is identified comprises:
   determining the relevance score for the search item based on one or more of a size, color, or position of text from which the search item is identified.

15. The system of claim 9, wherein selecting one or more of the multiple search items based on the relevance scores comprises:
   determining that the one or more of the multiple search items have respective relevance scores that satisfy a relevance threshold; and
   in response to determining that the one or more of the multiple search items have respective relevance scores that satisfy the relevance threshold, selecting the one or more of the multiple search items.

16. The system of claim 9, wherein the resource comprises one or more of a web page, an application page, or a textual conversation.

17. A non-transitory computer readable storage medium storing instructions executable by a data processing apparatus and upon such execution cause the data processing apparatus to perform operations comprising:
   receiving, from a user device, a query-independent request generated in response to an indication by a user on the user device for contextual information relevant to an active resource displayed in an application environment on the user device, wherein:
      the query-independent request is a request that does not include query parameters entered by the user, and
      the active resource includes content that can be visibly rendered in the application environment on the user device, wherein the content that can be visibly rendered is rendered in the application environment of an application that is running in a foreground of the user device in a first portion of content currently displayed on a display of the user device, and in a second portion of content that is not currently displayed on the display of the user device;
   identifying multiple search items from content in the active resource, the identifying comprising:
      selecting only the first portion of content currently displayed on the user device; and
      determining, from only the first portion of content, the multiple search items;
   determining a type of the active resource displayed on the display from among multiple different types of active resources including a textual conversation and a web page;
   determining a relevance score for each of the multiple search items based on the type determined of the active resource, wherein:
      the relevance score reflects a degree of confidence that the user would like to see contextual information about the search item,
      the relevance score is determined further based on a location, on the display of the user device, of displayed text that corresponds to the search item, and
      the relevance scores determined for search items corresponding to displayed text in certain locations on the display reflect a higher degree of confidence that the user would like to see the corresponding contextual information than relevance scores determined for search items corresponding to displayed text in other locations on the display, wherein the certain locations and the other locations differ depending on the type determined of the active resource;
   selecting one or more of the multiple search items based on the relevance scores; and
   providing, to the user device for each of the selected one or more multiple search items, a respective contextual user interface element for display with the active resource, wherein each contextual user interface element includes contextual information regarding the respective search item.

18. The method of claim 1, wherein determining a relevance score for each of the multiple search items comprises:
   determining that the active resource displayed in the application environment of the user device is a textual conversation; and
   in response to determining that the active resource is a textual conversation, determining the relevance score for a search item such that search items determined from text messages that appears closest to a bottom of the display of the user device have a higher relevance score than the relevance scores for search items determined from text messages that appears closest to a top of the display of the user device.

19. The system of claim 9, wherein determining a relevance score for each of the multiple search items comprises:
   in response to determining that the active resource is a textual conversation, determining the relevance score for a search item such that search items determined from text messages that appears closest to a bottom of the display of the user device have a higher relevance score than the relevance scores for search items determined from text messages that appears closest to a top of the display of the user device.

20. The computer readable medium of claim 17, wherein determining a relevance score for each of the multiple search items comprises:

in response to determining that the resource is a textual conversation, determining the relevance score for a search item such that search items determined from text messages that appears closest to a bottom of the display of the user device have a higher relevance score than the relevance scores for search items determined from text message that appears closest to a top of the display of the user device.

\* \* \* \* \*